3,324,175
PROCESS FOR PREPARING p-AMINOBENZOIC ACID
James Edgar Mallonee, Wilmington, Del., assignor to E. I. du Pont de Nemours and Company, Wilmington, Del., a corporation of Delaware
No Drawing. Filed Nov. 7, 1962, Ser. No. 236,770
4 Claims. (Cl. 260—518)

This invention is directed to a novel process for the manufacture of p-aminobenzoic acid by catalytic hydrogenation.

p-Aminobenzoic acid and its water-soluble salts are important intermediates for dyes, anti-oxidants, developers, pharmaceuticals and other products. The production of p-aminobenzoic acid from p-nitrobenzoic acid is disclosed in U.S. 2,947,781. The disclosure of U.S. 2,947,781 pertains to the process of preparing p-aminobenzoic acid by hydrogenating a water suspension of p-nitrobenzoic acid in the presence of a catalyst consisting of platinum or palladium or their oxides. Although this process is a means of preparing the aminobenzoic acid both at reduced cost compared with previous methods and in a high state of purity, the output of the product is limited in given equipment by the amount of the nitro compound that can be held in suspension in the water and still allow the relatively high speed agitation required for high rates of hydrogenation. To increase the output of product by the process taught in U.S. 2,947,781, it is necessary to use a thin slurry of the nitro compound. This thin slurry contains about 8% by weight of the nitro compound.

It is, therefore, an object of this invention to prepare p-aminobenzoic acid by a novel process.

It is another object of this invention to increase the output of the product in the preparation of p-aminobenzoic acid.

It is a still further object to produce p-aminobenzoic acid as a mixture of its sodium and ammonium salts in aqueous solution for direct use as an intermediate.

These and other objects will become apparent from the following description and claims.

More specifically, this invention is directed to an improved process for preparing p-aminobenzoic acid which comprises (1) Forming an aqueous solution of 30% to 50% by weight of a mixture of ammonium and sodium salts of p-nitrobenzoic acid, said salt mixture containing at least five weight percent of the ammonium salt of p-nitrobenzoic acid, (2) Adding hydrogen at 100 p.s.i.g. to 600 p.s.i.g. to said aqueous solution in the presence of a hydrogenation catalyst, said aqueous solution having a pH range of about 7.0 to 7.5, and a temperature range from about 80° C. to 120° C., (3) Filtering the solution at a temperature above 50° C., and (4) Recovering p-aminobenzoic acid by acidifying the filtrate to about pH 4.0, filtering the resultant slurry, and washing and drying the filter cake.

The sodium salt of p-nitrobenzoic acid is soluble in water at 60° C. to the extent of 25%. Higher amounts of the sodium salt form a slurry which at concentrations above 30% of the salt, particularly in the range of 40% to 50%, is thick and difficult to agitate and hydrogenate. It has now been discovered that a clear solution entirely free from solid material is obtained at salt concentrations as high as 50% where a portion of the p-nitrobenzoic acid is neutralized with ammonia, forming the ammonium salt and mixed with the sodium salt. To attain this degree of solubility the ammonium salt should be at least five percent by weight of the salt mixture, and preferably ten percent. The ammonium salt alone may be used to provide a soluble form of the p-nitrobenzoic acid at these high concentrations, but its solubilizing effect upon the sodium salt provides a more economical process.

The improved process is carried out in standard equipment which may consist of solution make-up tanks; a jacketed, pressure reaction vessel fitted with a thermocouple, pressure gauge, agitator and equipped for hydrogenation; a filter press, and drying chambers. At the beginning of the process a water solution is prepared of a mixture of 30% to 50% by weight of the sodium and ammonium salts of p-nitrobenzoic acid. This solution is prepared by mixing a water slurry of the free acid with sodium hydroxide and ammonium hydroxide and heating the composition to 50° to 60° C. This solution may also be made by dissolving sodium hydroxide and ammonium hydroxide in water and adding the p-nitrobenzoic acid with agitation and heating. Another procedure to prepare this solution is to withhold the ammonium hydroxide until the sodium salt has formed and use the ammonia to neutralize the rest of the p-nitrobenzoic acid and to adjust the pH to a value between 7.0 and 7.5. The nitro compound may be technical grade, but should be free from catalyst poisons such as sulfur, copper, and their compounds.

The adjustment of the pH of the aqueous solution of the salts to the range 7.0 to 7.5 is important. A pH above this upper limit leads to the formation in the hydrogenation reaction of undesirable azo, hydrazo, azoxy and related products which not only reduce the yield of the p-aminobenzoic acid but discolor and otherwise affect the quality of the product. A pH below 7.0 allows p-aminobenzoic acid to be separated from its salt mixture. Such a separation may result in a loss of product in the subsequent filtering to remove the catalyst.

The process is preferably operated with a hydrogen pressure between 100 p.s.i.g. and 600 p.s.i.g. At the pressure below 100 p.s.i.g. the reaction is slow and less practical. Pressures above 600 p.s.i.g. require heavier, more specialized equipment than pressures within the preferred range and do not provide compensating advantages. The temperature is preferably maintained between 80° and 120° C. because at lower temperatures the reaction is slower and the purpose of attaining a higher production output is defeated while at higher temperatures the tendency for side reactions is enhanced and there is no practical need for the higher reaction rates provided by the higher temperatures.

The catalyst employed is that commonly used for hydrogenation such at platinum or palladium or their oxides or mixtures of these noble metals and their oxides supported on carbon or other porous substrates. Finely divided nickel may also be employed as the catalyst in the subject hydrogenation process.

After reduction is complete, the catalyst is removed from the aqueous mass by filtering the mixture at a temperature of at least 50° C. The filtrate which consists of a solution of the sodium and ammonium salts of p-aminobenzoic acid may be used directly, if desired, for subsequent reactions without isolation of the free acid. Such a reaction which effectively employs this salt solution is the acetylation of this salt solution by reaction of acetic anhydride to provide p-acetamidobenzoic acid. When the aim is to provide p-aminobenzoic acid the filtered salt solution is acidified with a mineral acid such as hydrochloric, sulfuric, or phosphoric acid to about a pH of 4.0 and cooled to room temperature. The precipitated product, p-aminobenzoic acid, is filtered from the aqueous slurry, washed with water, and dried in a drying chamber such as a vacuum oven.

Representative examples illustrating the present invention follow. Parts and percentages are by weight unless specified otherwise.

EXAMPLE I

A steel make-up tank is charged with 67.5 parts of water, 71.8 parts of 30% caustic soda solution, 3.7 parts of 27% aqueous ammonia and 100 parts of p-nitrobenzoic acid. The mixture is agitated and heated to 55° C. to form a clear light amber solution which contains 46.5% of a mixture of ammonium and sodium salts of p-nitrobenbzoic acid. The salt mixture consists of 9.7% of the ammonium salt and 90.3% of the sodium salt. The pH of the solution is 7.3. Should the solution be outside the pH range of about 7.0 to 7.5, the pH is adjusted to fall within this range by adding a small amount of aqueous ammonia or p-nitrobenzoic acid.

The above solution in a quantity of 100 parts is then pumped to a hydrogenation autoclave and to it is added 0.004 part of palladium supported on 0.14 part of carbon. The autoclave is swept with nitrogen, and its contents are heated to 90° C. Hydrogen is added at 400 p.s.i.g. until less than 0.2% of the starting p-nitrobenzoic acid remains. The presence of unreacted nitro-body is determined by titration of a sample of the reaction mass with titanous chloride. The time of reaction required is about 8 hours, and about 280 parts of hydrogen (taken as cubic feet at standard conditions) are absorbed. The pressure is released, and the charge is pumped through a catalyst recovery filter press at a temperature above 60° C.

The filtrate of this filtration step is then acidified to a pH of 4.0 with a 10% hydrochloric acid solution and cooled to room temperature. The resultant acid solution slurry of p-aminobenzoic acid is filtered, the filter cake is washed with water, and the p-aminobenzoic acid is dried at 60° C. in a current of nitrogen gas. A yield of 3.21 parts (95% of theory) of good quality p-aminobenzoic acid of over 99.5% purity is obtained.

EXAMPLE II

Another 100 part quantity of the solution of mixed sodium and ammonium salts of p-nitrobenzoic acid as prepared in Example I is pumped to a hydrogenation autoclave and to it is added 0.3 part of reduced nickel supported on 0.83 part of diatomaceous earth. The nitro compounds are then hydrogenated as in Example I over a three hour period. The reaction product is processed in a manner similar to Example I and 32.0 parts of good quality p-aminobenzoic acid are obtained.

It is to be understood that the preceding examples are representative and that said examples may be varied within the scope of the total specification, as understood by one skilled in the art to produce essentially the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing p-aminobenzoic acid which comprises
    (1) forming an aqueous solution of 30% to 50% by weight of a mixture of ammonium and sodium salts of p-nitrobenzoic acid, said salt mixture containing at least 5% by weight of the ammonium salt of p-nitrobenzoic acid,
    (2) adding hydrogen at 100 p.s.i.g. to 600 pi.i.s.g. to said aqueous solution in the presence of a carbon supported hydrogenation catalyst selected from the group consisting of platinum and palladium and their oxides, said aqueous solution having a pH range of about 7.0 to 7.5 and a temperature range of from 80° C. to 120° C.,
    (3) filtering the solution at a temperature above 50° C., and
    (4) recovering p-aminobenzoic acid by acidifying the filtrate to about a pH of 4.0, filtering the resultant slurry, and washing and drying the filter cake.

2. A process for preparing p-aminobenzoic acid which comprises
    (1) forming an aqueous solution of 30% to 50% by weight of a mixture of ammonium and sodium salts of p-nitrobenzoic acid wherein said salt mixture contains at least 5% by weight of the ammonium salt and up to 95% by weight of the sodium salt of p-nitrobenzoic acid,
    (2) adding hydrogen at 100 p.s.i.g. to 600 p.s.i.g. to said aqueous solution in the presence of a carbon supported hydrogenation catalyst selected from the group consisting of platinum and palladium and their oxides, said aqueous solution having a pH range of about 7.0 to 7.5 and a temperature range of from 80° C. to 120° C.,
    (3) filtering the solution at a temperature above 50° C., and
    (4) recovering a p-aminobenzoic acid by acidifying the filtrate to about a pH of 4.0, filtering the resultant slurry, and washing and drying the filter cake.

3. A process for preparing p-aminobenzoic acid which comprises
    (1) forming an aqueous solution of 30% to 50% by weight of a mixture of ammonium and sodium salts of p-nitrobenzoic acid, wherein said salt mixture contains approximately 10% by weight of the ammonium salt and approximately 90% by weight of the sodium salt of p-nitrobenzoic acid,
    (2) adding hydrogen at 100 p.s.i.g. to 600 p.s.i.g. to said aqueous solution in the presence of a carbon supported palladium hydrogenation catalyst, said aqueous solution having a pH range of about 7.0 to 7.5 and a temperature range of from 80° C. to 120° C.,
    (3) filtering the solution at a temperature above 60° C., and
    (4) recovering p-aminobenzoic acid by acidifying the filtrate to about a pH of 4.0 with a 10% hydrochloric acid solution, filtering the resultant slurry, and washing and drying the filter cake.

4. A process for preparing an aqueous solution of water soluble salts of p-aminobenzoic acid which comprises
    (1) forming an aqueous solution of 30% to 50% by weight of a mixture of ammonium and sodium salts of p-nitrobenzoic acid, wherein said salt mixture contains at least 5% by weight of the ammonium salt and up to 95% by weight of the sodium salt of p-nitrobenzoic acid,
    (2) adding hydrogen at 100 p.s.i.g. to 600 p.s.i.g. to said aqueous solution in the presence of a carbon supported hydrogenation catalyst selected from the group consisting of platinum and palladium and their oxides, said aqueous solution having a pH range of about 7.0 to 7.5 and a temperature of from 80° C. to 120° c., and
    (3) obtaining the aqueous solution of the ammonium and sodium salts of p-aminobenzoic acid by filtering the solution at a temperature above 50° C. to remove the catalyst.

References Cited

UNITED STATES PATENTS 2,947,781  8/1960  Spiegler _____ 260—518

FOREIGN PATENTS 121,795  3/1958  U.S.S.R.

OTHER REFERENCES

Chemical Abstracts, 50, 12618g (1956).
Scholnik et al., J. Am. Chem. Soc., vol. 63, (1941), pp. 1192–93.

LORRAINE A. WEINBERGER, *Primary Examiner.*
DANIEL D. HORWITZ, *Examiner.*
L. ARNOLD THAXTON, *Assistant Examiner.*